United States Patent
Mor et al.

(10) Patent No.: US 7,333,432 B1
(45) Date of Patent: Feb. 19, 2008

(54) METHOD AND APPARATUS FOR CONFIGURING NETWORK ELEMENTS TO SUPPORT REAL TIME APPLICATIONS

(75) Inventors: Yishay Mor, Zichron Ya'akov (IL); Dror Koren, Zichron Ya'akov (IL)

(73) Assignee: Cisco Technology, Inc., San Jose, CA (US)

( * ) Notice: Subject to any disclaimer, the term of this patent is extended or adjusted under 35 U.S.C. 154(b) by 1153 days.

(21) Appl. No.: 10/210,505

(22) Filed: Jul. 31, 2002

Related U.S. Application Data

(63) Continuation-in-part of application No. 10/076,258, filed on Feb. 12, 2002.

(51) Int. Cl.
*H04L 12/56* (2006.01)

(52) U.S. Cl. ............... 370/230.1; 370/237; 370/238; 370/401

(58) Field of Classification Search ............. 370/230.1, 370/237, 238, 352, 401, 254
See application file for complete search history.

(56) References Cited

U.S. PATENT DOCUMENTS

| | | | |
|---|---|---|---|
| 5,359,593 A | 10/1994 | Derby et al. | |
| 5,594,792 A | 1/1997 | Chouraki et al. | |
| 5,928,331 A | 7/1999 | Bushmitch | |
| 5,968,176 A | 10/1999 | Nessett et al. | |
| 5,970,064 A | 10/1999 | Clark et al. | |
| 6,009,081 A | 12/1999 | Wheeler et al. | |
| 6,021,263 A | 2/2000 | Kujoory et al. | |
| 6,021,439 A | 2/2000 | Turek et al. | |
| 6,028,842 A | 2/2000 | Chapman et al. | |
| 6,046,980 A | 4/2000 | Packer | |
| 6,047,322 A | 4/2000 | Vaid et al. | |
| 6,061,725 A | 5/2000 | Schwaller et al. | |
| 6,104,700 A | * | 8/2000 | Haddock et al. ............ 370/235 |
| 6,118,760 A | | 9/2000 | Zaumen et al. |
| 6,154,776 A | * | 11/2000 | Martin ....................... 709/226 |
| 6,167,445 A | | 12/2000 | Gai et al. |
| 6,169,748 B1 | | 1/2001 | Barbas et al. |
| 6,170,009 B1 | | 1/2001 | Mandal et al. |

(Continued)

OTHER PUBLICATIONS

S. Blake, et al., "An Architecture for Differentiated Services," Dec. 1998, Network Working Group, Request for Comments: 2475, pp. 1-36.

(Continued)

*Primary Examiner*—Hassan Kizou
*Assistant Examiner*—Jay P. Patel
(74) *Attorney, Agent, or Firm*—Hickman Palermo Truong & Becker LLP

(57) ABSTRACT

Techniques for configuring a network to support real-time applications include determining a first role of multiple of roles performed by network elements to completely support a particular real-time application. Each role is associated with multiple groups of policies. Each group of policies includes one or more policies associated with a class of network elements. The network includes multiple classes. Each policy includes a configuration command that causes a network element of an associated class to perform an action on a data packet to support an associated role. A first subset of network elements is selected from the network. The first subset includes network elements that perform the first role. The selection is based at least in part on network links in the network. Each network element in the first subset is associated with a group associated with the first role.

25 Claims, 11 Drawing Sheets

U.S. PATENT DOCUMENTS

| | | |
|---|---|---|
| 6,212,184 B1 | 4/2001 | Venkatachary et al. |
| 6,286,052 B1 | 9/2001 | McCloghrie et al. |
| 6,301,253 B1 | 10/2001 | Ichikawa |
| 6,301,613 B1 | 10/2001 | Ahlstrom et al. |
| 6,324,184 B1 | 11/2001 | Hou et al. |
| 6,327,618 B1 | 12/2001 | Ahlstrom et al. |
| 6,363,429 B1 | 3/2002 | Ketcham |
| 6,393,473 B1 | 5/2002 | Chu |
| 6,401,240 B1 | 6/2002 | Summers |
| 6,424,659 B2 | 7/2002 | Viswanadham et al. |
| 6,430,154 B1 | 8/2002 | Hunt et al. |
| 6,442,151 B1 | 8/2002 | H'mimy et al. |
| 6,463,470 B1 | 10/2002 | Mohaban et al. |
| 6,466,984 B1 | 10/2002 | Naveh et al. |
| 6,473,793 B1 | 10/2002 | Dillion et al. |
| 6,483,805 B1 | 11/2002 | Davies et al. |
| 6,484,261 B1 | 11/2002 | Wiegel |
| 6,539,425 B1 | 3/2003 | Stevens et al. |
| 6,570,875 B1 | 5/2003 | Hegde |
| 6,577,644 B1 | 6/2003 | Chuah et al. |
| 6,594,268 B1 | 7/2003 | Aukia et al. |
| 6,601,082 B1 | 7/2003 | Durham et al. |
| 6,611,863 B1 * | 8/2003 | Banginwar .................. 709/220 |
| 6,611,864 B2 | 8/2003 | Putzolu et al. |
| 6,621,793 B2 | 9/2003 | Widegreen et al. |
| 6,622,170 B1 | 9/2003 | Harrison et al. |
| 6,651,191 B1 | 11/2003 | Vacante et al. |
| 6,671,724 B1 | 12/2003 | Pandya et al. |
| 6,684,244 B1 | 1/2004 | Goldman et al. |
| 6,718,379 B1 | 4/2004 | Krishna et al. |
| 6,718,380 B1 | 4/2004 | Mohaban et al. |
| 6,763,392 B1 * | 7/2004 | del Val et al. .............. 709/231 |
| 6,826,147 B1 | 11/2004 | Nandy et al. |
| 6,839,766 B1 | 1/2005 | Parnafes et al. |
| 6,934,258 B1 * | 8/2005 | Smith et al. ................ 370/238 |
| 6,959,332 B1 | 10/2005 | Zavalkovsky et al. |
| 7,054,327 B2 * | 5/2006 | Hagirahim et al. ......... 370/410 |
| 2002/0065907 A1 | 5/2002 | Cloonan et al. |

OTHER PUBLICATIONS

D. Durham, et al., "The COPS (Common Open Policy Service) Protocol," Jan. 2000, Network Working Group, Request for Comments: 2748, pp. 1-38.

S. Herzog, et al., "COPS usage for RSVP," Jan. 2000, Network Working Group, Request for Comments: 2749, pp. 1-17.

R. Braden, et al., "Resource ReSerVation Protocol (RSVP)—Version 1 Functional Specification," Sep. 1997, http://www.ietf.org/rfc/rfc2205.txt.?number=2205, printed Sep. 19, 2003, pp. 1-105.

* cited by examiner

FIG. 3A

302 WINDOW

398 CONTROL ELEMENTS FOR SELECTING OTHER QOS MANAGEMENT FUNCTIONS

396 DISPLAY FOR IP TELEPHONY CONFIGURATION WINDOWS NAVIGATION

304 EXPLANATORY TEXT FOR SELECTING NETWORK

306 CONTROL ELEMENT TO SELECT NETWORK

390 CONTROL ELEMENTS FOR IP TELEPHONY CONFIGURATION WINDOWS NAVIGATION

| 391 BACK BUTTON | 392 NEXT BUTTON | 393 FINISH BUTTON | 394 CANCEL BUTTON |

FIG. 3B

310 WINDOW

398 CONTROL ELEMENTS FOR SELECTING OTHER QOS MANAGEMENT FUNCTIONS

396 DISPLAY FOR IP TELEPHONY CONFIGURATION WINDOWS NAVIGATION

312 EXPLANATORY TEXT FOR SELECTING DEVICES WITH IP TELEPHONY

316 CONTROL ELEMENTS TO SELECT CORRESPONDING DEVICES

314 LIST OF IP TELEPHONY CAPABLE DEVICES

390 CONTROL ELEMENTS FOR IP TELEPHONY CONFIGURATION WINDOWS NAVIGATION

| 391 BACK BUTTON | 392 NEXT BUTTON | 393 FINISH BUTTON | 394 CANCEL BUTTON |

FIG. 3C

320 WINDOW

398 CONTROL ELEMENTS FOR SELECTING OTHER QOS MANAGEMENT FUNCTIONS

396 DISPLAY FOR IP TELEPHONY CONFIGURATION WINDOWS NAVIGATION

322 EXPLANATORY MATERIAL FOR NEXT ROLE IN IP TELEPHONY (E.G., IP PHONE CONNECTIONS)

326 CONTROL ELEMENTS TO SELECT CORRESPONDING NETWORK ELEMENTS

324 LIST OF IP TELEPHONY CAPABLE NETWORK ELEMENTS FOR ROLE (E.G., INTERFACES FOR IP PHONE CONNECTIONS)

390 CONTROL ELEMENTS FOR IP TELEPHONY CONFIGURATION WINDOWS NAVIGATION

| 391 BACK BUTTON | 392 NEXT BUTTON | 393 FINISH BUTTON | 394 CANCEL BUTTON |

FIG. 4B

METHOD AND APPARATUS FOR CONFIGURING NETWORK ELEMENTS TO SUPPORT REAL TIME APPLICATIONS

CROSS-REFERENCE TO RELATED APPLICATIONS; PRIORITY CLAIM

This application claims benefit as a Continuation-in-part of prior application Ser. No. 10/076,258, of Dror Koren and Gil Sheinfeld ("Koren"), filed Feb. 12, 2002, the entire contents of which are hereby incorporated by reference as if fully set forth herein, under 35 U.S.C. §120.

FIELD OF THE INVENTION

The present invention relates generally to configuration management of communication networks, and more specifically to techniques for configuration management of network elements to support real-time packet media communication applications.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In today's high performance internetworks, predictable performance of business-critical applications is needed. Further, real-time applications (e.g., voice, video-conferencing, streaming audio or streaming video), for which minimizing data transmission latency is critical, need to be integrated with bursty data services. As a result, differentiated handling of network traffic is needed.

Quality of Service ("QoS") enables complex networks to control and predictably service a variety of applications. The goal of QoS is to provide consistent, predictable network services for different kinds of network traffic by delivering dedicated bandwidth, controlling jitter and latency, managing congestion and improving traffic flow efficiency. Bandwidth is related to the amount of data that can be transmitted in a unit of time and is often expressed as a number of binary digits (bits) per second. Network latency is a measure of the delay between when a data packet is placed on the network and when it arrives at its destination; jitter refers to variations in network latency.

QoS is a set of capabilities that allow the delivery of differentiated services for network traffic, thereby providing better service for selected network traffic. For example, with QoS, bandwidth of critical traffic can be increased, bandwidth for non-critical traffic can be limited, and consistent network response can be provided. This allows expensive network connections to be used more efficiently, and a network service provider to establish service level agreements with its customers.

QoS typically is implemented in software tools that execute in network devices and management stations. QoS tools generally are separated into three categories: classification, queuing and network provisioning. Classification tools mark a packet or flow with a specific priority. This marking establishes a trust boundary that must be enforced. Queuing tools assign a packet or flow to one of several queues, based on classification, for appropriate treatment in the network. Network provisioning tools accurately calculate the required bandwidth needed for voice conversations, all data traffic, any video applications and necessary link management overhead such as routing protocols, and configure network elements with appropriate QoS parameters.

For effective quality of service treatment, policies must be applied by all intermediate network elements in a path from sender to receiver for a particular message flow. A network element is a component of a network, including a device (such as a router, switch, or hub), a network interface (which may or may not map to a physical port) on such a device, and a virtual local area network (VLAN) which is a group of devices that are involved with passing data packets tagged with a VLAN identifier.

A QoS policy is a conditional statement that includes a set of conditions ("filters") on a data packet and a set of one or more QoS actions to perform on data packets passing into or out of a network element if the data packet satisfies the set of conditions. QoS actions include packet coloring, traffic shaping, priority queuing, custom queuing, limiting, and fragmentation, among other actions known in the art. Coloring assigns a relative importance to a packet. Shaping smoothes the rate of flow of outbound data packets by temporarily saving some packets in buffers until those packets can be transmitted within the specified rate. Queuing assigns outbound data packets to different queues that are given different precedence in the face of network congestion. Limiting limits the bandwidth available for outbound data packets. Fragmentation breaks a large data packet into several smaller data packets so that latency-critical data packets can be interleaved among the smaller fragments without waiting for the large data packet to be transmitted in its entirety.

Accordingly, various QoS management systems are now available. Certain leading systems of this type enable a user or administrator to create and store abstract QoS policies in terms of collections of rules and policy objects. An example of such a system is QoS Policy Manager, commercially available from Cisco Systems, Inc.

QoS tools are important in the management of internet protocol ("IP") networks for real-time applications. Real-time applications, such as voice applications like IP telephony (IPT), have different characteristics and requirements from those of other data applications. Real-time applications tolerate minimal delay and jitter affecting delivery of data packets by network elements. Voice traffic is also intolerant of lost packets (which causes voice clipping and skips) and unreasonably delayed packets (which can cause either voice quality degradation due to end-to-end voice latency or packet loss if delay is variable). Packet loss, delay and jitter all contribute to degraded voice quality. QoS tools available for use in networks are mechanisms to increase data quality on data networks for real-time applications by configuring network elements to result in decreasing dropped data packets for the real-time applications during times of network congestion and by minimizing both the delay and the jitter encountered in a given connection for real-time applications.

In past approaches, configuring QoS for real-time applications on an enterprise network has been difficult. The user has needed to know what interfaces to configure, what QoS policy to apply on each interface, and which QoS tools to use on each interface to implement each policy. The user has needed to enable QoS not just on a few wide-area network (WAN) links, but rather throughout the enterprise, including local-area networks (LANs). The QoS tools that have been available have varied with different devices, device models, and device operating system versions. After selecting the QoS tools, the user has needed to translate the configuration recommendations provided by the QoS tools into the command line interface ("CLI") commands understood by each device.

In the past, many of these tasks have been done manually for a particular device. Design guides, such as the Architecture for Voice, Video and Integrated Data (AVVID) QoS Design Guide, commercially available from Cisco Systems, Inc., provide answers as to what QoS to use and where, in order to manually configure QoS across a network. However, the user still needs to use the telnet protocol to send messages to each and every device and set the recommended commands. This is tedious, time-consuming and prone to human error, for example, from typographical errors inadvertently included in the configuration commands.

Based on the foregoing, there is a clear need for a method which will make the process of configuring QoS for voice or other real-time applications easier, such that the user does not need to do all the work in defining all the network elements to configure for real-time applications, to know what policy to implement at each network element, to know what QoS tools to use to establish each policy at each network element, and to translate each QoS tools into CLI commands.

Further, there is a specific need for a method that will enable new and expert users of packet voice networks to configure the QoS in their network for handling packet voice traffic in a rapid manner, without involving such users in arcane details underlying QoS techniques and implementations.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a block diagram of a window of a user interface for configuring network elements to support IP telephony by selecting a network, according to an embodiment;

FIG. 3B is a block diagram of a window of a user interface for configuring network elements to support IP telephony by selecting devices, according to an embodiment;

FIG. 3C is a block diagram of a window of a user interface for configuring network elements to support IP telephony by selecting elements that perform a particular role, according to an embodiment;

FIG. 4B is a screen display diagram that provides a specific example of a user interface that corresponds to FIG. 3A.

DETAILED DESCRIPTION OF THE PREFERRED EMBODIMENT

A method and apparatus for configuring network elements to support real-time applications are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
   2.1 Structural Overview
   2.2 Functional Overview
3.0 Method for Configuring Network Elements
4.0 Example of Configuring Network Elements for IP Telephony
   4.1 Example Policy Groups
   4.2 Example Distribution of Policy Groups
5.0 Implementation Mechanisms-Hardware Overview
6.0 Extensions and Alternatives 1.0 General Overview The needs identified in the foregoing Background, and other needs and objects that will become apparent for the following description, are achieved in the present invention, which comprises, in one aspect, a method for configuring network elements to support real-time applications. The method includes determining a first role of multiple roles performed by one or more network elements to completely support a particular real-time application. Each role is associated with multiple groups of policies. Each group of policies is associated with a class of network elements and includes one or more policies. Each class is one of multiple classes of network elements among the network elements. Each policy includes a configuration command that causes a network element of an associated class of the to perform an action on a data packet to support an associated role for the particular real-time application. From among the network elements, a first subset of one or more network elements is selected that will perform the first role. The first subset is selected based at least in part on links connecting the network elements. Each network element in the first subset is associated with an associated group of a first set of groups. The first set of groups is associated with the first role.

In other aspects, the invention encompasses a computer apparatus and a computer readable medium, including a carrier wave, configured to carry out the foregoing steps.

Embodiments of the invention may be used with any real-time application. For purposes of illustrating a specific example, example embodiments are described herein in the context of packet-switched voice networks based on Internet Protocol (IP) and that support IP telephony. However, this specific context is not required, and other real-time applications using other protocols may be substituted.

2.0 Structural and Functional Overview

2.1 Structural Overview

Figure 1:
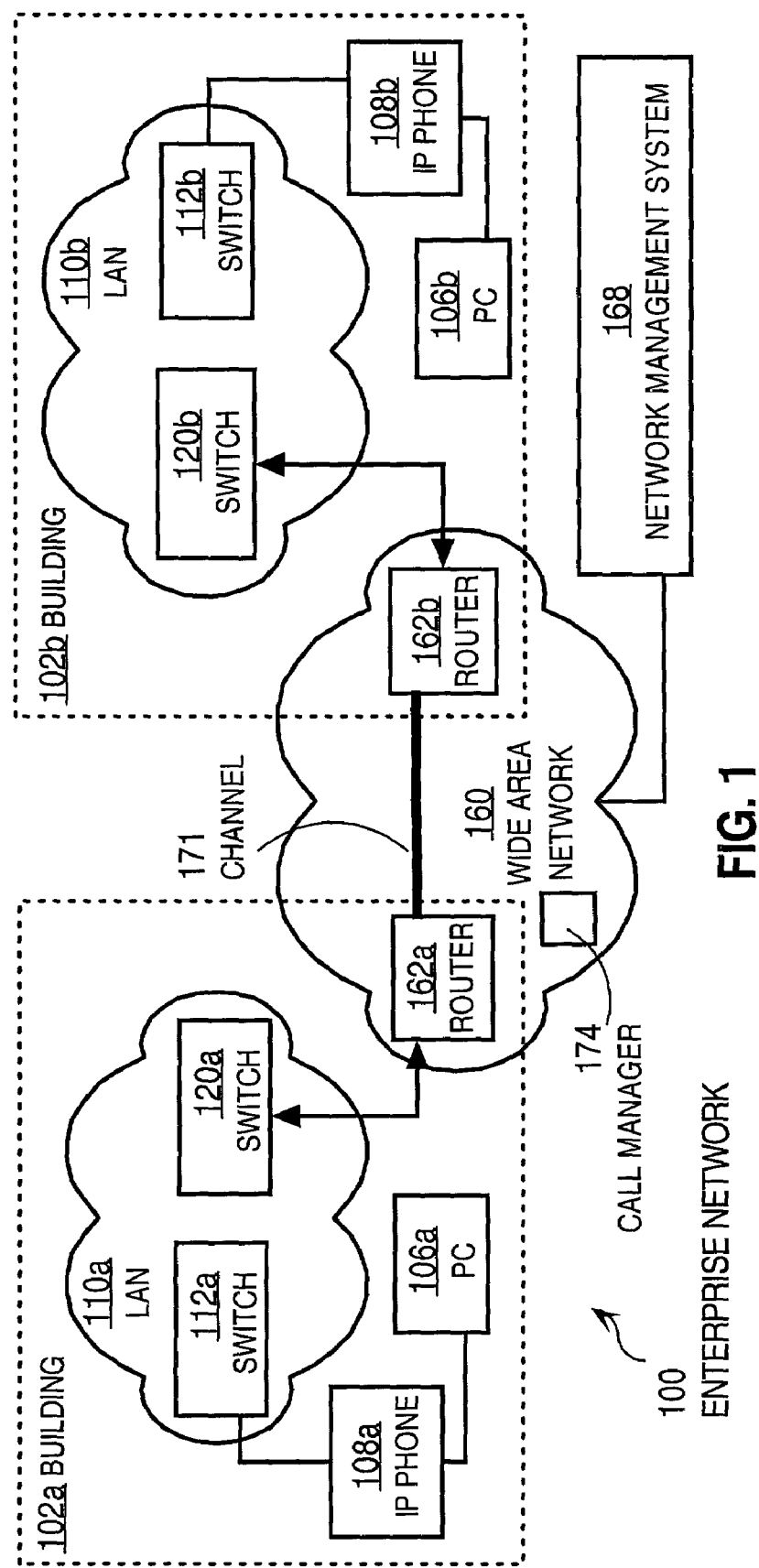
FIG. 1 is a block diagram that illustrates an overview of a network that supports IP telephony.

FIG. 1 is a block diagram that illustrates an overview of an example enterprise network 100 that supports IP telephony. For purposes of illustrating a simple example, FIG. 1 shows a limited number of network elements; however, in a practical embodiment there may be any number of network elements in many different configurations.

In the example of FIG. 1, two buildings 102*a*, 102*b* with local area networks (LANs) 110*a*, 110*b*, respectively, are connected by a wide area network (WAN) 160. Each network includes multiple network devices, each having one or more interfaces. For example, LAN 110*a* includes switches 112*a*, 120*a*, among others, and LAN 110*b* includes switches 112*b*, 120*b*, among others, and each switch has multiple interfaces. WAN 160 includes routers 162*a*, 162*b*, among others, each with multiple interfaces. Data packets are transported over the WAN using the Internet Protocol (IP). Certain links among networking devices in the WAN may be devoted to traffic between two particular routers such as routers 162*a*, 162*b*; such devoted links constitute a channel, such as channel 171, with a designated channel identifier.

To reduce consumption of bandwidth on the LANs 110*a*, 110*b*, either LAN, or both LANs, may be divided into two or more virtual local area networks (VLANs). The interfaces, devices and VLANs of enterprise network 100 are configured by a network administrator using network management system 168, which is coupled to the wide area network 160. In other embodiments, the network management system 168 may be connected to a LAN such as LAN 110*a* or LAN 110*b*. A network management system includes a computer system; a network management process based on stored instructions, and network management data. The network management system communicates with network management servers on each network device to configure the interfaces on that device.

To support real-time applications, a real time application program running on a computer, such as personal computers (PCs) 106*a*, 106*b*, or a special-purpose real time application device, such as IP telephones ("IP phones") 108*a*, 108*b*, or both, are connected to a LAN, such as LANs 110*a*, 110*b*. A "real-time application device" is used herein to refer to either a computer running a real-time application program, or a special-purpose real time application device. Latency-critical data is sent between a real-time application device transmitter and a real time application device receiver. An IP phone is both a real-time application device transmitter and a real-time application device receiver.

To the transmission of phone conversations over a packet network, a call manager process ("call manager") 174 runs on at least one device on the network. Although shown in FIG. 1 as within the WAN 160, in other embodiments, the call manager 174 may execute on a computer connected to the WAN or to a LAN, such as LAN 110*a* or LAN 110*b*. Cisco Call Manager is a commercial example of call manager 174.

2.2 Functional Overview

A network management system is used to configure the network elements of a network, including interfaces, devices, and VLANs, with QoS attributes to support real-time applications. For example, network management system 168 is used to configure the network elements of the enterprise network 100 with QoS attributes to support IP telephony. According to embodiments of the present invention, the network management system facilitates a network administrator's task by automatically determining different roles performed by different network elements in supporting the real-time application and by automatically associating with each network element, according to its role, one or more policies for acting on data packets passing into or out of that network element. These automatic actions rescue a human administrator from the complex, tedious, and error prone task of individually selecting one or more policies to apply to each network element in an enterprise network.

According to the application of Koren, an administrator uses the database management system to define and store QoS policy groups. A QoS policy template is similar to a policy group except that a template may not have network elements associated with it. In general, a user chooses a template and derives a policy group from it, which will retain the template's structure, and then assigns network elements to the group and deploy it.

The following additional terminology applies to this disclosure. A property is an unconditional statement defining a configuration action to be taken on a network element. A constraint is a statement that defines a limited set of network elements by common attributes, such as model, OS version, etc. A policy group is a collection of constraints, policies, properties and network elements, such that the constraints are consistent; all policies and properties can be implemented on any element matching any one of the constraints; and all network elements match at least one of the constraints. A template is a policy group minus the network elements. Policy groups can be associated to the template, so they inherit the constraints, policies and properties from it. Network elements can then be assigned to these policy groups. A role is a collection of policy groups and/or templates that implement the same logical functionality on network elements of contradicting attributes.

Each QoS policy group includes QoS tools that configure a class of network elements to perform certain QoS actions on data packet flow ("traffic") through the network element. The class is defined by one or more attributes of a target device, such as device type, device model, device operating system, operating system version number, and interface type. In some embodiments, the group includes data used to translate QoS tools into CLI commands that can be sent via telnet to individual devices or physical ports (interfaces). The administrator can then simultaneously deploy the same template to multiple network elements of the class. This reduces the task of repeating the same QoS tools and translating them into the same CLI commands at each of the network elements that belong to the class.

It would be useful to have a method for performing the still-tedious task of determining, among hundreds of network elements, a list of network elements to which a particular group is actually deployed. Koren discloses a network management system that, given a particular policy group, displays all the network devices that match the class of that particular policy group, and therefore displays all the devices that can implement the policy included in the policy group. Koren proposes a distribution manager but does not disclose its methods. A distribution manager that identifies the network elements that should implement each group of policies is provided herein.

For example, functions provided by network elements to completely support a real-time application are divided among multiple roles. The role that a network element performs depends on the network element's position within the network and the device or devices to which the network element is linked, e.g., directly connected. For example, a network element linked to a real-time application device, such as an IP phone, or a streaming audio source or a streaming video source, performs a different role than the same type of element connected only to other devices in a LAN. Associating network elements with roles helps to determine which group of policies should be deployed to that network element.

Referring to FIG. 1, a variety of example roles can be illustrated. One interface of Switch 112a is linked to a real-time application device, IP phone 108a, while one or more other interfaces of switch 112a are linked to other network devices within LAN 110a. The interface linked to IP phone 108a performs a different role, called herein an IP Phone role, than does an interface connected to other network elements within the LAN, called herein an IntraLAN role.

Table 1 describes several example roles illustrated by FIG. 1 among other roles. As clear from these descriptions, a variety of example roles are listed in Table 1 or illustrated in FIG. 1. However, in other embodiments, other roles for network elements may be defined for IP telephony or for other real-time applications.

TABLE 1

Example roles for network elements in IP Telephony.

| Role number | Role Name | Role Description | Example Network Element(s) in FIG. 1 |
|---|---|---|---|
| 1 | IP Phone | interface linked to IP Phone | Switch 112a interface connected to IP phone 108a; Switch 112b interface connected to IP phone 108b; |
| 2 | Soft phone | interface linked to computer with voice software | not shown |
| 3 | Call Manager | interface linked to call manager host | located in WAN 160 and connected to one of the switches |
| 4 | IntraLAN | interface linked to another LAN network element | Switch 112a, 120a interfaces linked to devices in LAN 110a; Switch 112b, 120b interfaces linked to devices in LAN 110b; |
| 5 | VoiceVLAN | interface linked to device on VLAN configured for voice | Switches 112a, 120a if they composed a voice VLAN. |
| 6 | Switch to WAN Router | a switch interface linked to a WAN router | Switch 120a interface linked to Router 162a; Switch 120b interface linked to Router 162b. |
| 7 | WAN Router to Switch | a WAN router interface linked to a switch | Router 162a interface linked to Switch 120a; Router 162b interface linked to Switch 120b; |
| 8 | WAN Point-to-Point | a WAN router interface linked to a point-to-point channel | Routers 162a, 162b interfaces to channel 171 |
| 9 | WAN Frame Relay | a WAN router interface linked to a frame relay channel | If channel 171 is a frame relay channel, routers 162a, 162b interfaces to channel |

A policy group is defined for each role for each class of network elements that can perform the role. A class of network elements is defined by a set of one or more device attributes, including device type, device model, interface number, interface type, operating system, and operating system version, among other attributes. Each policy group includes one or more policies and a list of attributes for network elements that belong to the class. Each policy group also includes data for translating QoS tools that implement the QoS policies to CLI commands understood by network elements of the class.

In one embodiment, a distribution manager process ("distribution manager") performs an analysis of network connections and determines the network elements that are connected in such a way as to perform each role, subject to user confirmation. A policy group is then automatically assigned to each network element based on the role the network element performs and the class to which the network element belongs. Alternatively, the foregoing functions are performed by the wizard as defined herein.

3.0 Method for Configuring Network Elements

Figure 2:
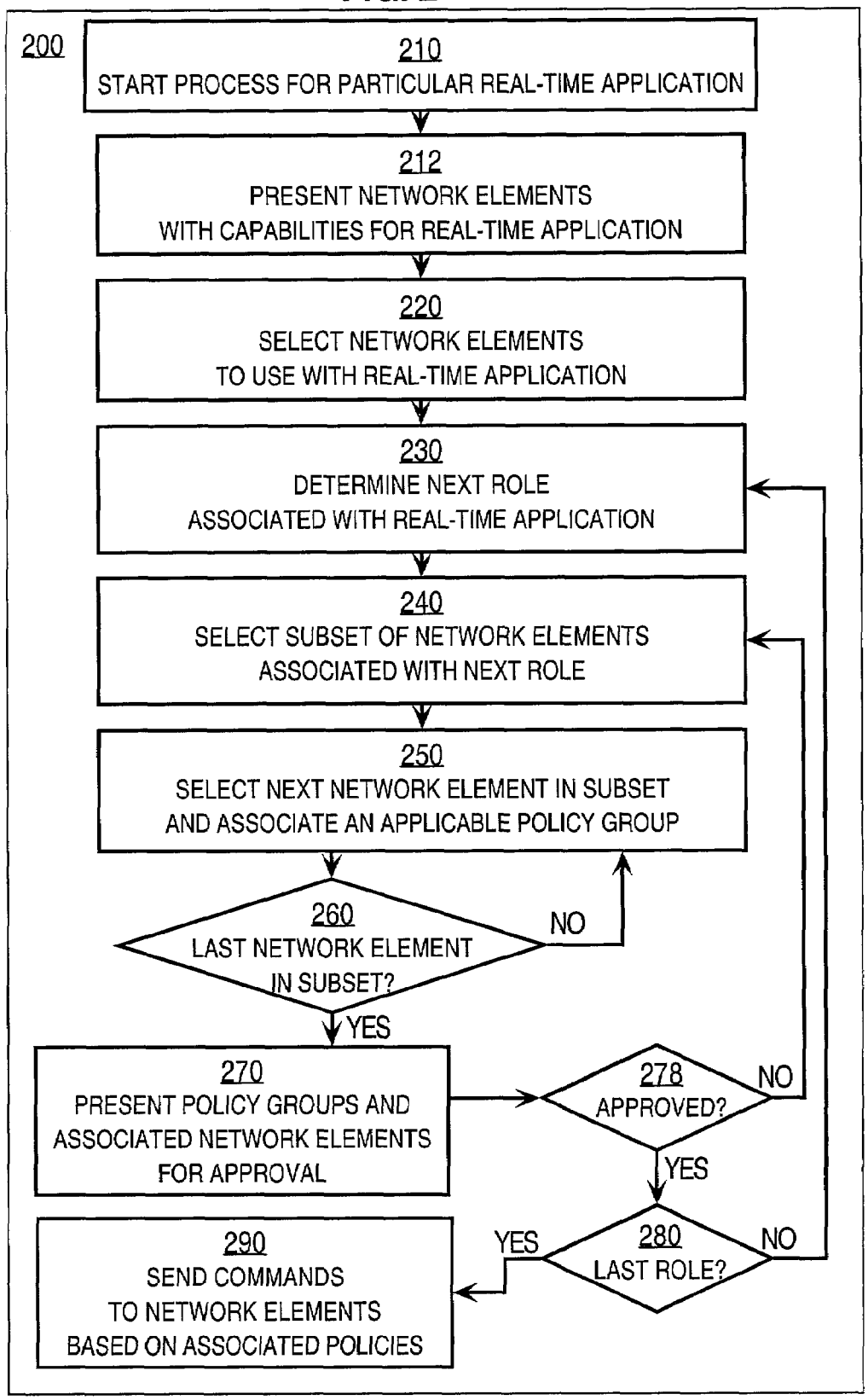
FIG. 2 is a flow diagram that illustrates a high level overview of one embodiment of a method for generating configurations for network elements to support real-time applications, according to an embodiment.

FIG. 2 is a flow diagram that illustrates a high level overview of an example embodiment of a method 200 for configuring network elements to support real-time applications. For purposes of illustration, assume that a distribution manager in the network management system 168 shown in FIG. 1 performs the steps of method 200. Although steps are shown in FIG. 2 in a particular order, in other embodiments, the steps may be performed in a different order or overlapping in time.

In step 210, a process is launched for a particular real-time application. In one embodiment, the process provides a configuration "wizard." In this context, a wizard is a process that presents a sequence of graphical user interface pages that prompt the user for input to accomplish a particular task and then accomplishes that task based on those inputs. Example user interface pages are described in more detail in a later section with reference to FIG. 3A, 3B, 3C, 3D.

Step 210 includes any steps involved in authenticating the user as a network administrator authorized to configure the network for the real-time application. In some embodiments, a different wizard is launched for each different real-time application. In other embodiments, one wizard is launched to configure a network for any of several real-time applications; in this case, step 210 includes receiving input from the network administrator indicating the particular real-time application to be supported. For example, the network administrator indicates that the network is to be configured for IP telephony. Although input from a system administrator is often desirable, it is not necessary; and, in some embodiments, the process is completely automated and does not require such input.

Step 210 also may include receiving input from the network administrator indicating the network domain is to be configured for IP telephony. For example, if the enterprise network 100 depicted in FIG. 1 includes a third LAN in a third building, but the third LAN is not involved in IP telephony, then step 210 includes input indicating that the network domain for IP telephony includes only the two LANs 110a, 110b and the WAN 160. In completely automated embodiments, the entire network administered by the network management system is considered the domain to be configured.

In step 212 the wizard presents to the user a list of all the network devices in the domain that are capable of supporting the real-time application. All other network elements residing on the network devices are selected automatically. In completely automated embodiments, step 212 may be omitted.

In step 220 the network elements for configuration are selected from the list of all the network elements in the selected network domain that can support the real-time application. In some embodiments, step 220 includes receiving input from the network administrator for deleting one or more network elements from the list presented in step 212, or adding one or more planned network elements to the list presented in step 212. In some embodiments, network elements are selected automatically from the list. For example, all LAN network elements capable of supporting the real-time application in LANs 110a, 110b are automatically selected, but only WAN network elements capable of IP telephony along one channel connecting the two LANs are automatically selected.

In step 230 the next role is determined from a set of roles defined for the real-time application. Functions performed by a single network element within a network to support a particular real-time application are assigned to one role of the set of roles. A set of one or more QoS policies describes the actions by a network element to perform each role. A policy group is a set of one or more policies that may be applied to any network element in a class of network elements and data that indicates the translations to CLI commands to implement the policies.

Any of several models of switches with any of several versions of an operating system may be able to perform a role. For example, the IP Phone role may be performed by an interface on a Catalyst 3550 device available from Cisco Systems Inc., and also by an interface on a Catalyst 6000 device. However, the QoS tools and CLI commands employed to support this role may be different for the different models and operating systems, thus involving different policy groups. Therefore several policy groups are associated with each role, one group for each class of network elements.

Further, one class of network elements may perform different roles. For example, a particular Ethernet interface on the Catalyst 6000 family devices may perform the IP Phone role if linked to an IP phone, or may perform an IntraLAN role if connected to another device on the LAN. A different set of policies may be associated with each different role performed by the same class of network elements. Thus, several policy groups are associated with each network element class, one for each role the network element class might perform.

Referring again to FIG. 2, in step 230 the next role associated with the real-time application is determined. For example, one of the roles in Table 1, such as the IP Phone role, is determined to be the next role for IP telephony.

In step 240, a subset of the network elements is selected for the role determined in step 230. The selection may be performed by a user, or a recommended subset of elements may be selected and presented to the user for confirmation. Initially, the subset is selected for the role based on network connections. For example, initially only network elements connected to an IP phone are included in the subset. For example, one interface on each of switches 112a, 112b initially is included in the subset for the IP Phone role, but no interfaces on switches 120a, 120b initially are included. Any rules for automatically including network elements in a subset for a particular role may be employed for the initial members of the subset. Additional example rules, some involving attributes of the devices themselves, are described for an example involving IP telephony in a later section. As an alternative to the example of selection based on network connections, other heuristics may be used to narrow the selection, such as a pattern found in the network element's name. As another alternative, the user might use any knowledge of the network design to determine a selection.

In some embodiments, the network administrator is allowed to modify the list of network elements performing the role during step 240. For example, the network administrator may contemplate moving an IP phone from one location on the LAN to a different location, so that an interface initially included in the subset is removed from the subset and an interface initially excluded is added. In completely automated embodiments, the initially selected subset is also the finally selected subset for the role; the same effect may be achieved by re-running the automatic process.

Steps 250-260 represent a loop through all the network elements in the subset. In step 250, the next network element in the subset is selected and associated with an applicable policy group. An applicable policy group is one that is associated with a class that includes the next network element. The policy group associated with a particular network element, from among the possibly several policy groups applicable for the network element, is the one associated with the role that was determined to be the next role in step 230. In this way, a single policy group is selected for a particular network element even though multiple policy groups may be applicable to the class that includes the particular network element.

In step 260, a test is performed to determine whether the last network element in the subset has just been associated with an applicable policy group. If so, then control passes to step 270. If not, then control returns to step 250 to select the next network element.

In step 270, the policy groups associated with network elements in the subset are presented to the network administrator for approval. Any presentation method and approval indication may be used. Presentation and approval in an example embodiment using a graphical user interface are described in more detail in a later section. In completely automated embodiments, step 270 may be omitted.

Step 278 represents a branch point in the flow of control. If the user does not approve the associations of policy groups with network elements, control passes back to step 240 to change the subset of network elements selected for the role. If the user does approve the associations of policy groups with network elements, control passes to step 280. In completely automated embodiments, step 278 may be omitted and control flows directly to step 280.

Steps 280, 230 represent a loop through all the roles for the particular real-time application. For example, steps 280, 230 represent a loop through all nine roles listed in Table 1 for IP Telephony. In step 280 it is determined whether the last of the roles has been processed through steps 240, 250, 260, 270, 278. If not, control returns to step 230 to determine the next role not already processed. If the last of the roles has been processed, control passes to step 290.

In step 290, optionally, commands are issued and sent to network elements to configure them for the real-time applications based on CLI command translations of QoS tools based on the policy group associated with each network element. In some embodiments, the network administrator is prompted to approve issuing the commands. Alternatively, the configuration set derived using the foregoing process is stored and then deployed in a separate operation at another time.

In some embodiments, data indicating progress toward the configuration of the network are stored after any step, for retrieval and reuse at a later time. The data stored at any step includes data indicating the network domain that is configured, the network elements selected for use with the real-time application, the network elements selected for each role, and the policy groups associated with each network element.

Using these techniques, the process of configuring QoS for voice or other real-time applications is easier, such that the user does not need to do all the work in defining all the network elements to configure for real-time applications, to know what policy to implement at each network element, to know what QoS tools to use to establish each policy at each network element, and to translate each QoS tools into CLI commands.

4.0 Example of Configuring Network Elements for IP Telephony

For purposes of illustration, assume the following. Enterprise network 100 is to be configured to support IP telephony between IP phones connected to LANs 110*a*, 110*b*. LANs 110*a*, 110*b* are connected to more IP phones than the IP phones 108*a*, 108*b* illustrated in FIG. 1, and LANs 110*a*, 110*b* are also connected to several personal computers (PCs), not shown, executing software to serve as soft phones. Network management system 168 includes a wizard to perform the steps of method 200, and a network administrator is operating the network management system 168.

The network administrator is presented with a window on a display device. The window includes tabs that the administrator can select to perform various network management functions, such as a "Devices" tab for defining the devices on the network and a "Configure" tab for configuring devices on the network. The administrator selects the Configure tab and is presented with multiple sub-tabs including a "Deployment Groups" sub-tab, a "Policy Groups" sub-tab and an "IP Telephony" sub-tab. The administrator defines one or more network domains under the Deployment Groups sub-tab according to any method known when the system is built.

4.1 Example Policy Groups

The administrator defines policy groups for classes of network elements for each of the roles listed above in Table 1 under the Policy Groups sub-tab according to methods described in Koren. At any time, an authorized network administrator may modify an existing group policy to generate a new group policy.

Assume that the administrator has defined the policy groups listed in Table 2, among others. In the Table 2, PFC, CoS, DSCP and TX are abbreviations. In some devices available from Cisco Systems, some QoS actions are performed centrally on an Application Specific Integrated Circuit (ASIC)-based card called the Policy Feature Card (PFC). CoS means Class of Service, which is one system for indicating priorities that influence QoS treatment. DSCP refers to Differential Services Code Point, another system for indicating priorities that influence QoS treatment. TX refers to 100base-TX, which is a fast Ethernet port; a TX queue is a transmission queue of a switch in which all packets are placed after all quality of service processing is complete and immediately before transmission into the network. There may be more than one TX queue having different priority values associated with them. Scheduling a TX queue refers to mapping CoS values to queue and threshold values. IOS refers to the Internetworking Operating System available from Cisco Systems, Inc.

TABLE 2

Example policy groups in IP Telephony.

| Policy Group number | Policy Group Name | Policy Group Description |
|---|---|---|
| 1 | Acc3550toIPPhone | Contains policies used for a Catalyst 3550 family switch port that is connected to an IP-Phone. |
| 2 | Acc6000toIPPhone | Contains policies used for a Catalyst 6000 (with PFC) family switch port that is connected to an IP-Phone. |
| 3 | VoiceDeviceCat3550 | Contains policies used for Catalyst 3550 devices that take part in the AVVID network and sets CoS to DSCP mappings. |
| 4 | VoiceDeviceCat4000 | Contains policies used for Catalyst 4000 devices that take part in the AVVID network and sets scheduling on the TX queue. |
| 5 | VoiceDeviceCat6000 | Contains policies used for Catalyst 6000 devices that take part in the AVVID network and sets scheduling on the TX queue and sets CoS to DSCP mappings. |
| 6 | VoiceDeviceCat6000IOS | Contains policies used for Catalyst 6000-IOS devices that take part in the AVVID network and sets CoS to DSCP mappings. Schedule settings are done on the ports. |

Assume that one or more network administrators have defined the policy group Acc6000toIPPhone as follows. The Acc6000toIPPhone policy group is applicable to a class of network elements as listed in Table 3 and includes QoS policies as listed in Table 4. The attributes that define the class of network elements are herein called constraints for the policy group.

TABLE 3

Example constraints on class of network elements for Acc6000toIPPhone policy group.

| Constraint Number | Device Model | Operating System Version | Compatible IOSs | Interface type | Network element |
|---|---|---|---|---|---|
| 1 | Cat6000_PFC2 | 6.2 | 6.1, 6.2, 6.3, 7.1 | Ethernet | Interface |
| 2 | Cat6000_PFC1 | 6.2 | 6.1, 6.2, 6.3, 7.1 | Ethernet | Interface |
| 3 | Cat6000_PFC2 | 6.1 | 6.1, 6.2, 6.3, 7.1 | Ethernet | Interface |
| 4 | Cat6000_PFC1 | 6.1 | 6.1, 6.2, 6.3, 7.1 | Ethernet | Interface |
| 5 | Cat6000_PFC2 | 6.3 | 6.1, 6.2, 6.3, 7.1 | Ethernet | Interface |
| 6 | Cat6000_PFC1 | 5.5 | 5.5, 6.1, 6.2, 6.3, 7.1 | Ethernet | Interface |
| 7 | Cat6000_PFC2 | 7.1 | 6.1, 6.2, 6.3, 7.1 | Ethernet | Interface |
| 8 | Cat6000_PFC1 | 6.3 | 6.1, 6.2, 6.3, 7.1 | Ethernet | Interface |
| 9 | Cat6000_PFC1 | 7.1 | 6.1, 6.2, 6.3, 7.1 | Ethernet | Interface |

This embodiment assumes that the IP phones are Cisco IP phones that color all their voice traffic with CoS=5. CoS=5 is mapped to DSCP=46 according to a CoS to DSCP mapping table maintained by the network management system. This example also assumes that the PCs connected to the access ports of the IP phones, such as PC 106*a*, 106*b*, are not allowed to classify their own traffic. Thus the IP phones re-classify all traffic from the PCs with CoS=0. This example further assumes that a voice VLAN for the voice traffic has been defined.

The QoS policies of this policy group extend the trust boundary of the Ethernet switch to the IP phone but not beyond the phone to the PC. "Trust State:trust-cos" sets the switch port to trust the CoS value from the IP phone and translate it into a value for the DSCP field according to the CoS to DSCP mapping table. "Trust Ext:untrusted" sets the switch port to not change the trust boundary from the IP phone. "QoS Style vlan-based" indicates that trust and color are applied only to traffic on the voice VLAN. Inline Power refers to a feature that enables power to come from the switch port to the IP phone rather than from an external power supply. Some switches have the ability to supply the electric power needed by the IP phone through the network cable. This capability has to be turned on when connecting a phone to the network, as the phone will have no power supply without it. On the other hand, connecting a different device to a port with inline power might disrupt the device operation, as it does not expect to receive electric power through the network line.

TABLE 4

Example QoS policies in the Acc6000toIPPhone policy group.

| Property Number | Property name | Property value |
|---|---|---|
| 1 | Inline Power | Enabled |
| 2 | QoS Style | vlan-based |
| 3 | Trust State | trust-cos |
| 4 | Trust Ext | untrusted |

In the example embodiment, the policy group stores these QoS policies in an abstract form, and the policies are translated into CLI commands to issue to network elements at the time of deployment. For example, the above policies are translated into CLI commands by substituting a particular list of ports for the parameter <ip-phone-port(s)> in the following data stored in the policies of the policy group:

set port qos <ip-phone-port(s)> trust-ext untrusted
set port qos <ip-phone-port(s)> trust trust-cos
set port qos <ip-phone-port(s)> vlan-based 4.2 Example Distribution of Policy Groups When the administrator selects the IP Telephony sub-tab, step 210 of FIG. 2 is performed, with IP telephony as the real-time application. Any user authentication and authorization needed and not already performed to operate the network management system is performed during this step.

In step 210, the administrator is presented with a window, such as illustrated in FIG. 3A. FIG. 3A is a block diagram of a window 302 of a user interface for configuring network elements to support IP telephony by selecting a network domain, according to an embodiment. Window 302 includes portions 390, 396, 398 that appear in multiple windows for configuring IP telephony, and portions 304, 306 that are unique to window 302 for selecting the network domain to configure for IP telephony. FIG. 4A is a screen display diagram that provides a specific example of a user interface that corresponds to FIG. 3A.

Window portion 398 includes control elements for selecting other management functions, including other QoS management functions. In an example embodiment, window portion 398 includes the tab for "Devices" as well as the currently selected "Configure" tab. In this embodiment, window portion 398 also includes a "Deploy" tab for deploying the configurations established in the current wizard, and also includes other tabs, such as a "Reports" tab for generating reports of network layout and status, and an "Admin" tab for performing administration functions such as registering authorized users.

In the example embodiment, the window portion 398 includes the sub-tabs for the currently selected Configure tab. The sub-tabs include the Deployment Groups sub-tab, the Policy Groups sub-tab and the currently selected IP Telephony sub-tab, among other tabs.

Window portion 396 includes a display for indicating the user's location among the windows of the IP Telephony sub-tab. In window 302, the contents of the window portion 396 includes a listing of the window names for windows used to navigate the configuration of IP Telephony at the next lowest level, including an Introduction window, a Select Devices window, nine role windows, and an End window. In window 302, the contents of the window portion 396 highlight the "Introduction" list entry, indicating the current window 302 is the Introduction Window.

Window portion 390 includes control elements for navigating between windows of the IP Telephony sub-tab, as displayed in window portion 396. In the example of FIG. 3A, window portion 390 includes a "Back" button 391, a "Next" button 392, a "Finish" button 393, and a "Cancel" button 394. These buttons are display areas that cause the wizard to perform a function when a pointing device is used to place a cursor over the button and an actuator on the pointing device is activated, such as by a user clicking on a particular button on the pointing device. When the Back button 391 is activated, the wizard presents the window shown in portion 396 to precede the current window. When the Next button 392 is activated, the wizard accepts all the inputs made on the current window, if any, saves them to storage, and presents the window shown in portion 396 to follow the current window. When the Finish button 393 is activated, the wizard accepts all the inputs made on the current window, if any, and stores the state of the configuration for the network determined to this point, and presents the End window included in portion 396 at the bottom of the list. When the Cancel button 392 is activated, the wizard refuses all the inputs made on the current window, if any, exits and presents the policy group display in the General tab.

Window portion 304 includes explanatory text for selecting a network domain (also called a "device group") on which elements are to be configured for IP Telephony. In the example of FIG. 4A, the window portion 304 includes statements such as the following "This IP Telephony Wizard is designed to help you to configure end-to-end QoS for voice traffic in enterprise networks, throughout campus domains, branch offices and WAN implementations;" and "You can use any deployment group to configure IP telephony QoS. Select the desired deployment group from the list box, if it is not already displayed."

In this context, for each device group, there may be several "deployment groups". A deployment group is a set of policy groups to be deployed concurrently to implement a complete and consistent configuration of all the devices in the device group. The user may define several alternative and mutually exclusive deployment groups for a single device group.

Window portion 306 includes one or more control elements for selecting the network domain. In the example embodiment, the control element is a list box including a downward arrow that can be activated by a user to show the choices from which the user can select. In the example embodiment, the list box includes a "Default Deployment Group" that includes policies that are defined per device group.

When the network administrator is finished selecting the network domain to configure for IP Telephony, the network administrator activates the Next button 392. Control then passes to step 212 of FIG. 2, to select network elements to use with the real time application.

In step 212, the administrator is presented with a window, such as illustrated in FIG. 3B. FIG. 3B is a block diagram of a window 310 of a user interface for configuring network elements to support IP telephony by selecting devices. FIG. 4B is a screen display diagram that provides a specific example of a user interface that corresponds to FIG. 3B.

Window 310 includes portions 390, 396, 398 that appear in multiple windows for configuring IP telephony, and portions 312, 314, 316 that are unique to window 310 for selecting network devices in the network domain to configure for IP telephony. The contents of window portion 396 for Window 310 highlight the "Select Devices" list entry, indicating the current window 310 is the Select Devices Window. In the example embodiment, the contents of window portion 396 also show subheadings for the current window that include "Select" and "Configuration Info."

Window portion 312 includes explanatory text for selecting devices within the selected network domain. In the example embodiment, the window portion 312 includes the following statement: "The wizard has discovered the following devices that support IP telephony and might require QoS configuration . . . Select the devices that you want to participate in the current IP Telephony wizard session. The wizard will configure only the network elements and devices from the selected devices."

Window portion 314 includes a list of the devices in the selected network domain. For example, the list includes the device name in the network management system, the device's network address, the device model name or number, and the operating system for the device. Assume, for example, that Switch 112a is a cat6000 device which is listed with system name "cd-dc6supt-3," network address "10.51.116.183," model "cat6000," and operating system "6.3."

Window portion 316 includes control elements for selecting or deselecting list entries in the list displayed in window portion 314. In the example embodiment, window portion 316 includes a checkbox for each device listed in window portion 314. A user changes the state of a checkbox from checked to unchecked, or vice versa, by positioning a cursor over the checkbox with the pointing device and activating the pointing device's actuator. In the example embodiment, every device listed is initially checked for inclusion in IP telephony. The network administrator may participate in step 220 by removing or adding devices using the checkboxes.

When the network administrator is finished deselecting the devices to configure for IP Telephony, the network administrator activates the Next button 392. The wizard then completes step 220 by selecting the devices still checked. Control then passes to step 230 of FIG. 2, to determine the next role associated with IP Telephony.

Step 230 determines that the next role is the role associated with the next window listed in the window portion 396. After the administrator activates the Next button from window 310, the next role is the IP Phone role, described above. Control then passes to step 240 to select a subset of network elements associated with the role.

In step 240, the administrator is presented with a window, such as illustrated in FIG. 3C. FIG. 3C is a block diagram of a window 320 of a user interface for configuring network elements to support IP telephony by selecting elements that perform a particular role, according to an embodiment. FIG. 4C is a screen display diagram that provides a specific example of a user interface that corresponds to FIG. 3C.

Window 320 includes portions 390, 396, 398 that appear in multiple windows for configuring IP telephony, and portions 322, 324, 326 that are unique to window 320 for selecting network elements to configure for the IP Phone role. The contents of window portion 396 for Window 310 highlight the "IP Phone" list entry, indicating the current window 320 is the IP Phone Window. In the example embodiment, the contents of window portion 396 also show subheadings for the current window that include "Select" and "Configuration Info."

Window portion 322 includes explanatory material for selecting network elements that perform the role. In the example embodiment, the window portion 322 includes a diagram of a PC and IP Phone connected to a switch and the following statements: "Select IP Phone Connections;" and "Select the switch ports on which the wizard will configure the QoS settings for the IP phone connections." In some embodiments, other statements describing the QoS policies for the IP Phone role are displayed in the window portion 322. Also, window portion 322 may include a control element for hiding or showing one or more of these statements Window portion 324 includes a list of the interfaces on the devices selected in step 220 that can serve in the IP Phone role. In the example embodiment, the list includes the interface name, the interface type, the bandwidth (also called "rate") and the system name of the device on which the interface resides. For purposes of illustration, assume that Ethernet interfaces on multiple switches in LANs 110a, 110b are included in the list.

Window portion 326 includes control elements for selecting or deselecting list entries in the list displayed in window portion 324. In the example embodiment, window portion 316 includes a checkbox for each item listed in window portion 314. In the example embodiment, certain interfaces are initially checked ("pre-selected") for performing the IP Phone role.

Any rules for automatically pre-selecting network elements may be used. It is anticipated that, in may embodiments, network administrators experienced in IP Telephony applications form the automatic pre-selection rules. The rules may depend at least in part on the connections between network elements, as well as on properties of network elements. For example, the pre-selection rules listed in Table 5 are used for the IP Phone role.

TABLE 5

Example pre-selection rules for the IP Phone role.

| Rule Number | Rule Type | Rule description |
|---|---|---|
| 1 | Exclusion | Exclude if interface has neighbor and neighbor is not an IP phone. |
| 2 | Inclusion | Include if interface has neighbor and neighbor is an IP phone. |
| 3 | Inclusion | Include if interface has no neighbor but device has a device role, and device role is Campus-Access and device has an auxiliary VLAN assignment. |
| 4 | Inclusion | Include if interface has no neighbor but device has a device role, and device role is Campus-Access and interface is on a power module. |
| 5 | Inclusion | Include if interface has no neighbor and device has no device role, and device has an auxiliary VLAN assignment. |
| 6 | Inclusion | Include if interface has no neighbor and device has no device role, and interface is on a power module. |

In some embodiments, the pre-selection rules are displayed in the window portion 322. In some embodiments, window portion 322 includes a control element for hiding or showing the pre-selection rules. In the illustrated embodiment depicted in FIG. 1, the interface on switch 112a linked to IP Phone 108a and the interface on switch 112b linked to IP Phone 108b are pre-selected; but the interface on switch 120a linked to router 162a and the interface on switch 120b linked to router 162b are not pre-selected. When hundreds or thousands of network elements are involved in the selected devices, automatic pre-selection frees the system administrator from much tedious effort.

The network administrator is than allowed to change the selections of network elements to perform the IP Phone role. For example, the network administrator may anticipate not using, for IP Telephony, some of the switch interfaces without neighbors that were pre-selected by the wizard; and the network administrator deselects those interfaces. When the network administrator is finished selecting and deselecting the interfaces to perform the IP Phone role, the network administrator activates the Next button 392. Assume for the present that the network administrator does not change the pre-selected interfaces. Control then passes to the loop represented by steps 250, 260 of FIG. 2, to associate a policy group with each network element selected to perform the IP Phone role.

In step 250 the wizard checks each network element selected as a result of step 240 against the constraints for the class of network elements for each policy group associated with the role. In the example embodiment, the policy groups associated with the IP Phone role are Acc3550toIPPhone and Acc6000toIPPhone. The network element is associated with the policy group if the network element satisfies the constraints for the policy group. Assume, for purposes of illustration, that the Switch 113 is a Cat6000 family device with a PFC. Because Switch 112a is a Cat6000 family device with operating system 6.3, as noted above, it satisfies either constraint 5 or constraint 8 listed in Table 3, above. Therefore Switch 112a is associated with policy group Acc6000toIPPhone during the loop through steps 250, 260. Assume, for purposes of illustration, that Switch 112b is a Cat3550 family device that satisfies at least one of the constraints of policy group Acc3550toIPPhone. Therefore, Switch 112b is associated with policy group Acc3550toIPPhone during the loop through steps 250, 260.

Control then passes to step 270 to present the policy groups and associated network elements for approval.

Figure 3D:
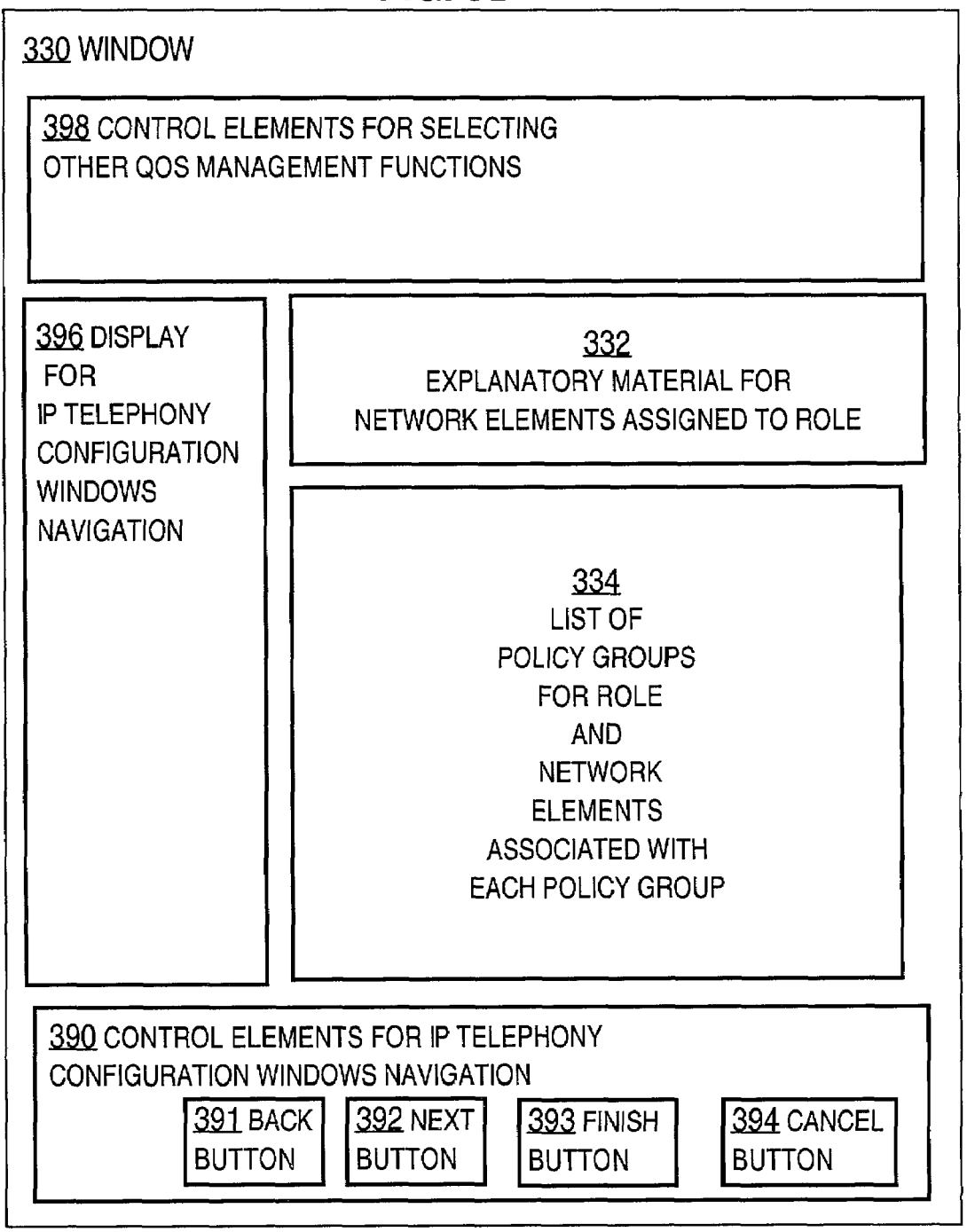
FIG. 3D is a block diagram of a window of a user interface for configuring network elements to support IP telephony by presenting elements associated with each policy group for a particular role, according to an embodiment.
Figure 4A:
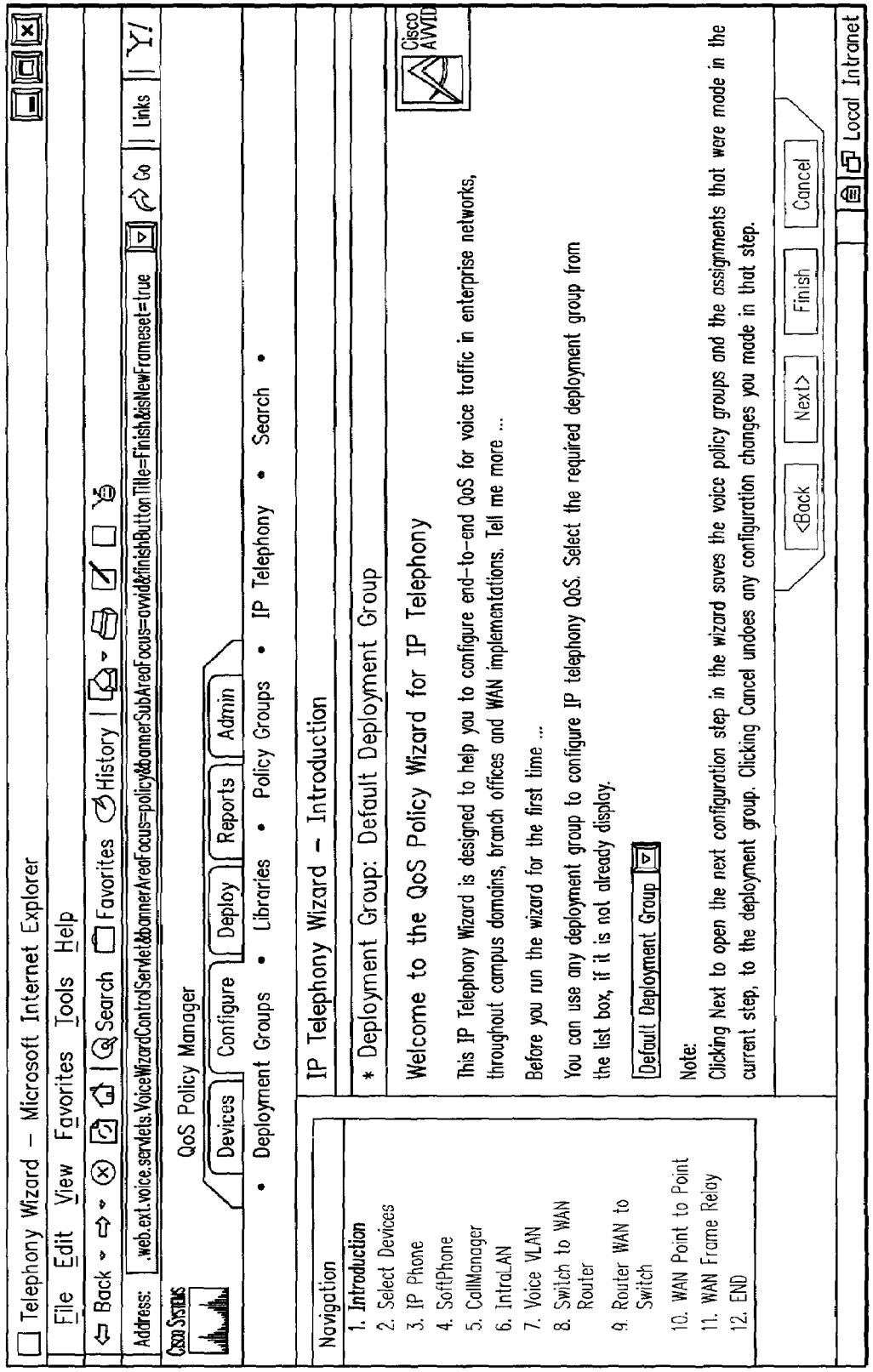
FIG. 4A is a screen display diagram that provides a specific example of a user interface that corresponds to FIG. 3A.
Figure 4B:
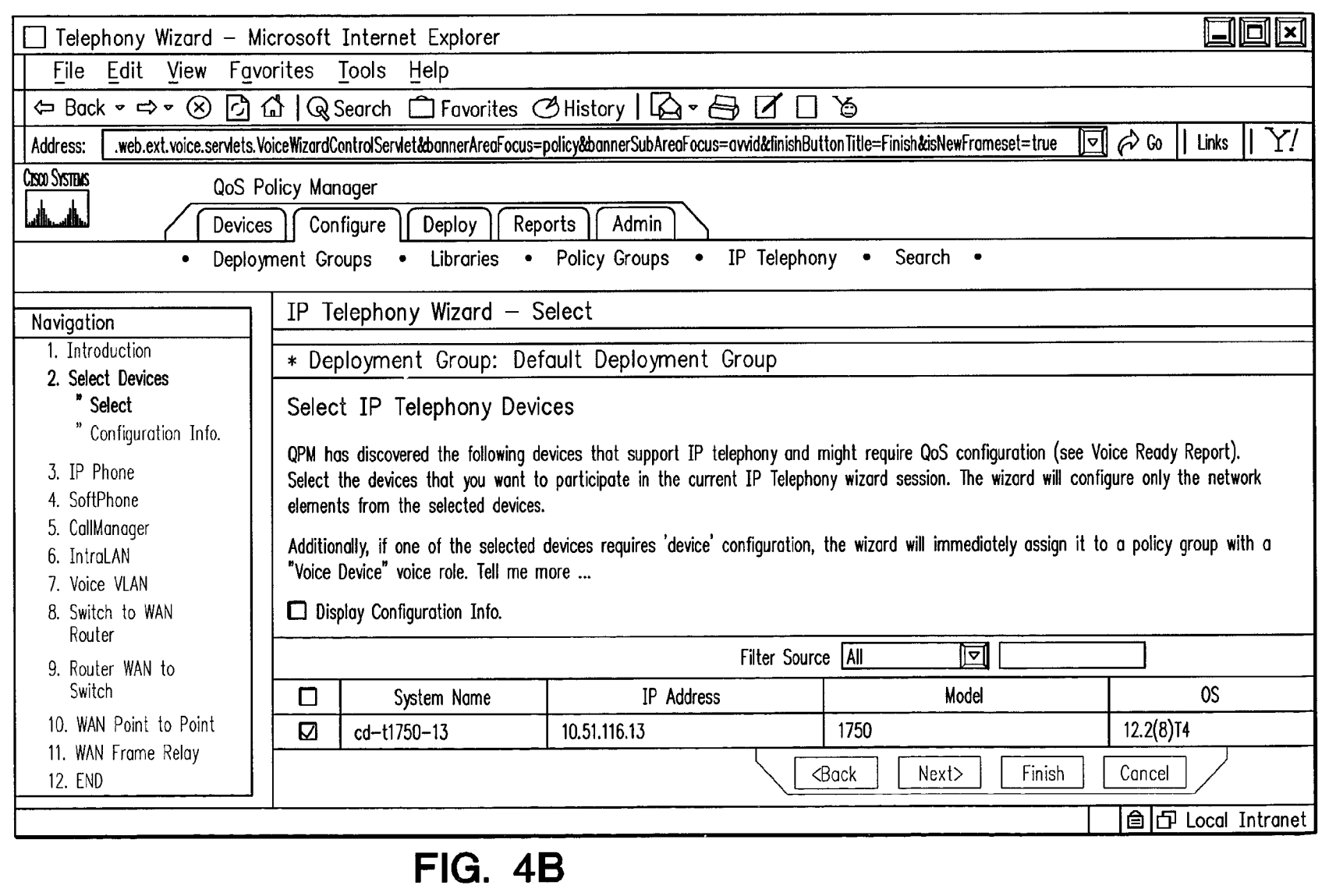
Figure 4C:
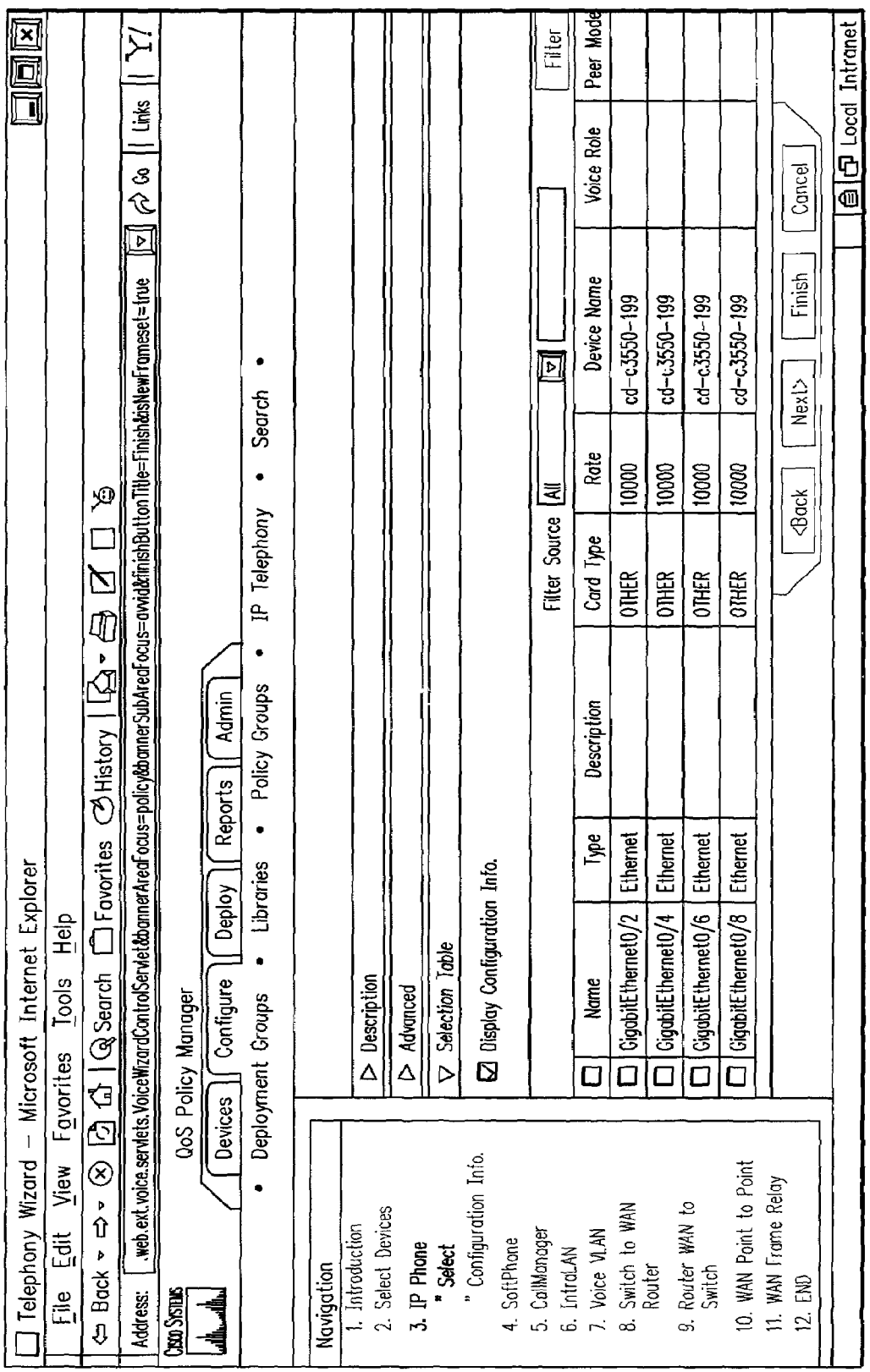
FIG. 4C is a screen display diagram that provides a specific example of a user interface that corresponds to FIG. 3A.
Figure 4D:
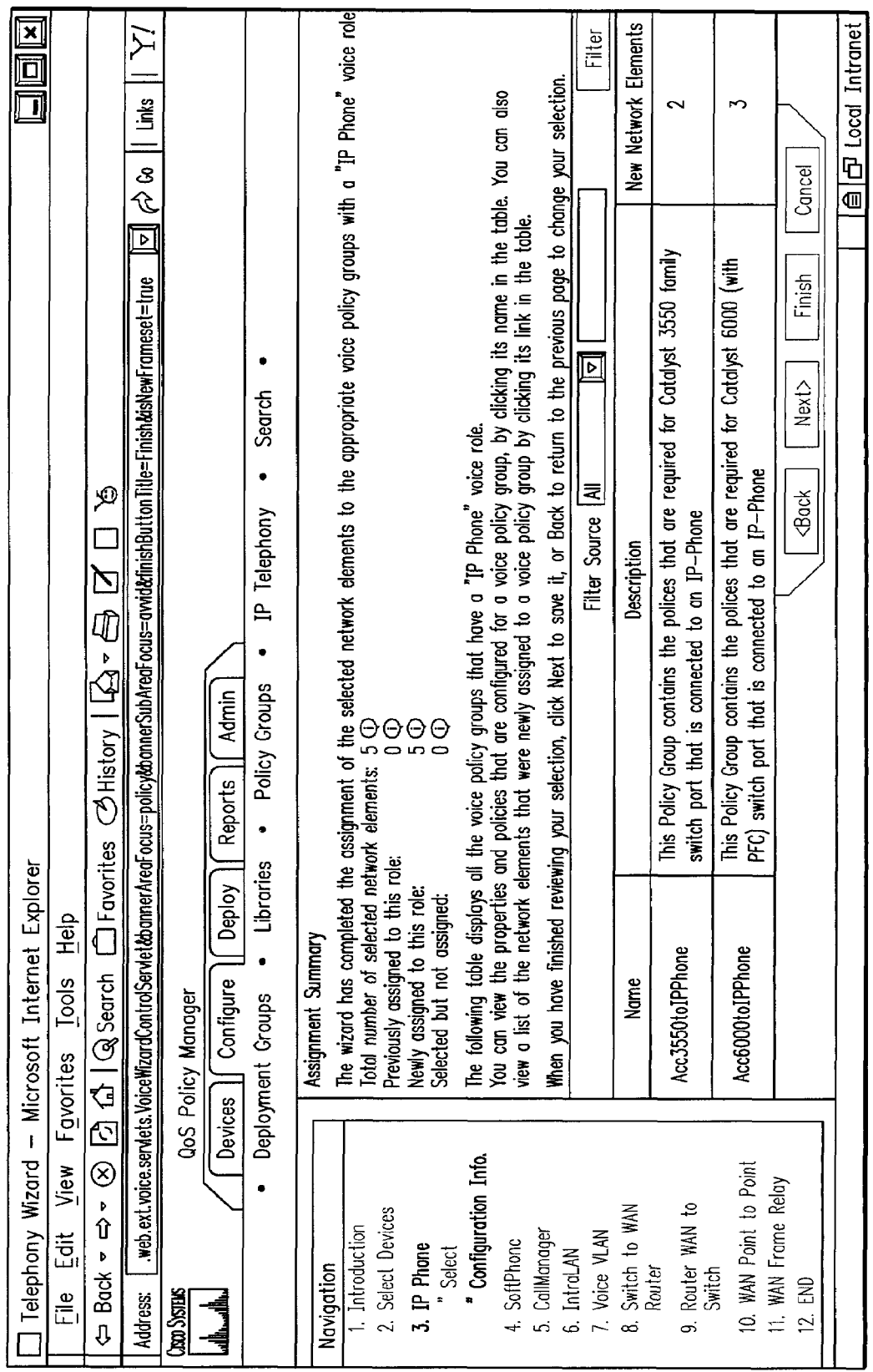
FIG. 4D is a screen display diagram that provides a specific example of a user interface that corresponds to FIG. 3A.

In step 270, the administrator is presented with a window, such as illustrated in FIG. 3D. FIG. 3D is a block diagram of a window 330 of a user interface for configuring network elements to support IP telephony by presenting elements associated with each policy group for a particular role. FIG. 4D is a screen display diagram that provides a specific example of a user interface that corresponds to FIG. 3D.

Window 330 includes portions 390, 396, 398 that appear in multiple windows for configuring IP telephony, and portions 332, 334 that are unique to window 330 for approving policy groups associated with network elements. The contents of window portion 396 for Window 330 highlight the "IP Phone" and "Configuration Info." list entries, indicating the current window 330 is an IP Phone Window that presents configuration information.

Window portion 332 includes explanatory text for approving policy groups associated with network elements within the highlighted role. In the example embodiment, the window portion 332 includes the following statements: "The wizard has completed the assignment of the selected network elements to the appropriate voice policy groups with a 'IP Phone' voice role;" "Total number of selected network elements assigned: X1;" "Previously assigned to this role: X2;" "Newly assigned to this role: X3;" "Selected but not assigned: X4;" "The following table displays all the voice policy groups that have a 'IP Phone' voice role. You can view the properties and policies that are configured for a voice policy group by clicking its name in the table. You can also view a list of the network elements that were newly assigned to a voice policy group by clicking its link in the table;" and "When you have finished reviewing your selection, click Next to save it, or Back to return to the previous page to change your selection." Here "X1," "X2," "X3," "X4" are symbols for some numbers. In some embodiments, window portion 332 includes one or more control elements so that a user can obtain more information about one or more of these statements.

Window portion 334 includes a list of the policy groups and the number of network elements associated with the policy group. In the example embodiment, the list includes the policy group name, the description of the policy group, and the number of network elements newly assigned to the policy group. By clicking on the number of network elements, a list of the network elements is presented. For example, by clicking on the number of elements assigned to policy group Acc6000toIPPhone, a list is presented that includes the interface of Switch 112a linked to IP Phone 108a.

When the network administrator approves the assignment of network elements to policy groups, the network administrator activates the Next button 392. Control then passes to step 230 of FIG. 2, to determine the next role associated with IP Telephony. Steps 230 through 278 are repeated for each role, presenting the user with windows 320, 330 for each role.

When the last role is completed, control passes to step 290. In step 290, the network administrator reaches the End window for IP Telephony. In the End window, the user is presented with instructions on how to deploy the assigned policy groups to the associated network elements to configure them for end-to-end IP Telephony. For example, the user is prompted to name and store data indicating the network elements and assignments; and the user is instructed to activate the Deploy tab when the network elements are to be reconfigured.

As described above, techniques of the present invention enable new and expert users of packet telephony to configure the QoS in their network almost immediately using pre-defined policy groups, without delving into arcane details underlying QoS techniques and implementations.

5.0 Implementation Mechanisms—Hardware Overview

In one embodiment, the foregoing processes are implemented using a distributed, Web-based architecture. Computational steps may be performed one computer, but the user interface is seen and operated through a browser, which may be run over a different computer. Furthermore, various components of the computational apparatus (e.g., logical processing and database) may reside on separate computers and communicate using a LAN connection.

Figure 5:
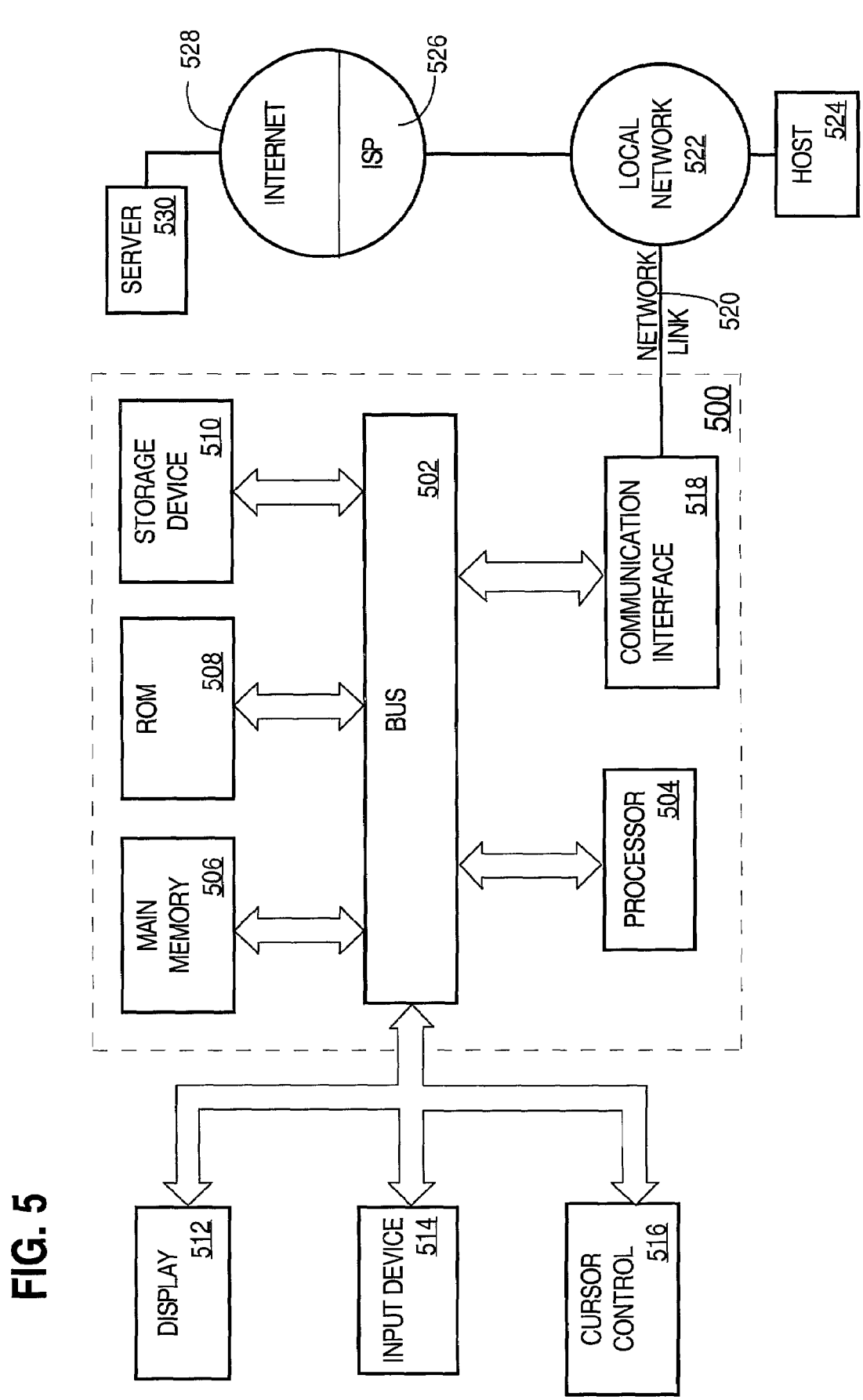
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for configuring network elements to support real-time applications. According to one embodiment of the invention, configuring network elements to support real-time applications is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for configuring network elements as described herein.

The received code may be executed by processor 504 as it is received, and/or stored in storage device 510, or other non-volatile storage for later execution. In this manner, computer system 500 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of configuring a plurality of network elements linked together by a plurality of links to support real-time applications, the method comprising the computer-implemented steps of:
   determining a first role of a plurality of roles performed by one or more network elements to completely support a particular real-time application, wherein:
      each role is associated with a plurality of groups of policies,
      each group of policies includes one or more policies,
      each group of policies is associated with a class of network elements of a plurality of classes of network elements among the plurality of network elements, wherein device attributes of a first class of network elements contradict device attributes of a second class of network elements, and
      each policy includes a configuration command that causes a network element of an associated class of the plurality of classes to perform an action on a data packet to support an associated role of the plurality of roles for the particular real-time application;
   selecting from the plurality of network elements a first subset of one or more network elements that will perform the first role based at least in part on the plurality of links; and
   associating each network element in the first subset with an associated group of a first plurality of groups of policies associated with the first role.

2. A method as recited in claim 1, further comprising the step of storing data indicating an association between a network element in the first subset and the associated group as determined during said associating step.

3. A method as recited in claim 1, further comprising the step of issuing to a network element of the first subset a configuration command included in a policy in the associated group as determined during said associating step.

4. A method as recited in claim 1, further comprising the steps of:
   determining a second role of the plurality of roles, the second role associated with a second plurality of groups of policies;
   selecting from the plurality of network elements a second subset of one or more network elements that will perform the second role based at least in part on the plurality of links; and
   associating each network element in the second subset with an associated group of the second plurality of groups of policies.

5. The method as recited in claim 1, said step of selecting the first subset further comprising the steps of:
   presenting, to a network administrator, the one or more network elements for the first subset based at least in part on the plurality of links; and
   receiving input from the network administrator indicating at least one of acceptance of the one or more network elements for the first subset, a network element to add to the first subset, and a network element to remove from the first subset.

6. The method as recited in claim 1, said step of associating each network element in the first subset with an associated group further comprising the steps of:
   presenting, to a network administrator, data indicating a group of policies and a number of network devices of the first subset associated with the group; and
   receiving input from the network administrator indicating at least one of acceptance of the group of policies, and rejection of the group of policies.

7. A method as recited in claim 1, wherein the plurality of roles include at least two of a connection to a device for the particular real-time application, a connection to a call manager for the particular real-time application, a local area network (LAN) connection, a virtual local area network (VLAN) connection, a connection from a LAN switch to a wide area network (WAN) router, a connection from a WAN router to a LAN switch, a WAN point-to-point connection, and a WAN frame relay connection.

8. The method as recited in claim 1, wherein the particular real-time application is Internet Protocol telephony.

9. A computer-readable medium carrying one or more sequences of instructions for configuring a plurality of network elements linked together by a plurality of links to support real-time applications, which instructions, when executed by one or more processors, cause the one or more processors to carry out the steps of:
   determining a first role of a plurality of roles performed by one or more network elements to completely support a particular real-time application, wherein:
      each role is associated with a plurality of groups of policies,
      each group of policies includes one or more policies,
      each group of policies is associated with a class of network elements of a plurality of classes of network elements among the plurality of network elements, wherein device attributes of a first class of network elements contradict device attributes of a second class of network elements, and
      each policy includes a configuration command that causes a network element of an associated class of the plurality of classes to perform an action on a data packet to support an associated role of the plurality of roles for the particular real-time application;
   selecting from the plurality of network elements a first subset of one or more network elements that will perform the first role based at least in part on the plurality of links; and
   associating each network element in the first subset with an associated group of a first plurality of groups of policies associated with the first role.

10. A computer-readable medium as recited in claim 9, further comprising the step of storing data indicating an association between a network element in the first subset and the associated group as determined during said associating step.

11. A computer-readable medium as recited in claim 9, further comprising the step of issuing to a network element of the first subset a configuration command included in a policy in the associated group as determined during said associating step.

12. A computer-readable medium as recited in claim 9, further comprising the steps of:
   determining a second role of the plurality of roles, the second role associated with a second plurality of groups of policies;
   selecting from the plurality of network elements a second subset of one or more network elements that will perform the second role based at least in part on the plurality of links; and
   associating each network element in the second subset with an associated group of the second plurality of groups of policies.

13. A computer-readable medium as recited in claim 9, said step of selecting the first subset further comprising the steps of:
presenting, to a network administrator, the one or more network elements for the first subset based at least in part on the plurality of links; and
receiving input from the network administrator indicating at least one of acceptance of the one or more network elements for the first subset, a network element to add to the first subset, and a network element to remove from the first subset.

14. A computer-readable medium as recited in claim 9, said step of associating each network element in the first subset with an associated group further comprising the steps of:
presenting, to a network administrator, data indicating a group of policies and a number of network devices of the first subset associated with the group; and
receiving input from the network administrator indicating at least one of acceptance of the group of policies, and rejection of the group of policies.

15. A computer-readable medium as recited in claim 9, wherein the plurality of roles include at least two of a connection to a device for the particular real-time application, a connection to a call manager for the particular real-time application, a local area network (LAN) connection, a virtual local area network (VLAN) connection, a connection from a LAN switch to a wide area network (WAN) router, a connection from a WAN router to a LAN switch, a WAN point-to-point connection, and a WAN frame relay connection.

16. A computer-readable medium as recited in claim 9, wherein the particular real-time application is Internet Protocol telephony.

17. An apparatus for configuring a plurality of network elements linked together by a plurality of links to support real-time applications, comprising:
means for determining a first role of a plurality of roles performed by one or more network elements to completely support a particular real-time application, wherein:
each role is associated with a plurality of groups of policies,
each group of policies includes one or more policies,
each group of policies is associated with a class of network elements of a plurality of classes of network elements among the plurality of network elements, wherein device attributes of a first class of network elements contradict device attributes of a second class of network elements, and
each policy includes a configuration command that causes a network element of an associated class of the plurality of classes to perform an action on a data packet to support an associated role of the plurality of roles for the particular real-time application;
means for selecting from the plurality of network elements a first subset of one or more network elements that will perform the first role based at least in part on the plurality of links; and
means for associating each network element in the first subset with an associated group of a first plurality of groups of policies associated with the first role.

18. An apparatus for configuring a plurality of network elements linked together by a plurality of links to support real-time applications, comprising:
a network interface that is coupled to a data network for receiving one or more packet flows therefrom;
a processor;
one or more stored sequences of instructions which, when executed by the processor, cause the processor to carry out the steps of:
determining a first role of a plurality of roles performed by one or more network elements to completely support a particular real-time application, wherein:
each role is associated with a plurality of groups of policies,
each group of policies includes one or more policies,
each group of policies is associated with a class of network elements of a plurality of classes of network elements among the plurality of network elements, wherein device attributes of a first class of network elements contradict device attributes of a second class of network elements, and
each policy includes a configuration command that causes a network element of an associated class of the plurality of classes to perform an action on a data packet to support an associated role of the plurality of roles for the particular real-time application;
selecting from the plurality of network elements a first subset of one or more network elements that will perform the first role based at least in part on the plurality of links; and
associating each network element in the first subset with an associated group of a first plurality of groups of policies associated with the first role.

19. An apparatus as recited in claim 18, wherein the instructions further comprise the step of storing data indicating an association between a network element in the first subset and the associated group as determined during said associating step.

20. An apparatus as recited in claim 18, wherein the instructions further comprise the step of issuing to a network element of the first subset a configuration command included in a policy in the associated group as determined during said associating step.

21. An apparatus as recited in claim 18, wherein the instructions further cause the processor to carry out the steps of:
determining a second role of the plurality of roles, the second role associated with a second plurality of groups of policies;
selecting from the plurality of network elements a second subset of one or more network elements that will perform the second role based at least in part on the plurality of links; and
associating each network element in the second subset with an associated group of the second plurality of groups of policies.

22. An apparatus as recited in claim 18, wherein said step of selecting the first subset further comprising the steps of:
presenting, to a network administrator, the one or more network elements for the first subset based at least in part on the plurality of links; and
receiving input from the network administrator indicating at least one of acceptance of the one or more network elements for the first subset, a network element to add to the first subset, and a network element to remove from the first subset.

23. An apparatus as recited in claim 18, wherein said step of associating each network element in the first subset with an associated group further comprising the steps of:
presenting, to a network administrator, data indicating a group of policies and a number of network devices of the first subset associated with the group; and receiving input from the network administrator indicating at least one of acceptance of the group of policies, and rejection of the group of policies.

24. An apparatus as recited in claim 18, wherein the plurality of roles include at least two of a connection to a device for the particular real-time application, a connection to a call manager for the particular real-time application, a local area network (LAN) connection, a virtual local area network (VLAN) connection, a connection from a LAN switch to a wide area network (WAN) router, a connection from a WAN router to a LAN switch, a WAN point-to-point connection, and a WAN frame relay connection.

25. An apparatus as recited in claim 18, wherein the particular real-time application is Internet Protocol telephony.

* * * * *